United States Patent [19]

Daley

[11] 4,039,650
[45] Aug. 2, 1977

[54] SULFUR DIOXIDE REDUCTION

[75] Inventor: William D. Daley, Morristown, N.J.

[73] Assignee: Allied Chemical Corporation, Morris Township, N.J.

[21] Appl. No.: 684,529

[22] Filed: May 10, 1976

[51] Int. Cl.$^2$ ............................................. C01B 17/04
[52] U.S. Cl. .................................... 423/569; 423/576
[58] Field of Search ............... 423/567, 569, 570, 576, 423/564

[56] References Cited

U.S. PATENT DOCUMENTS

| | | | |
|---|---|---|---|
| 2,208,247 | 7/1940 | Carter | 423/570 |
| 3,865,927 | 2/1975 | Watson | 423/570 |
| 3,927,191 | 12/1975 | Archambault et al. | 423/570 |
| 3,928,547 | 12/1975 | Daley | 423/570 X |

Primary Examiner—G. O. Peters
Attorney, Agent, or Firm—Gerhard H. Fuchs; Anthony J. Stewart

[57] ABSTRACT

Sulfur dioxide is reduced to sulfur and hydrogen sulfide with a gaseous reducing agent in the presence of a catalyst by a process involving mixing a sulfur dioxide-containing gas stream with a portion of the gaseous reducing agent and passing the resulting mixture through a first reactor to effect reduction of a portion of the sulfur dioxide to hydrogen sulfide and sulfur, mixing the gas stream from the first reactor with the remaining gaseous reducing agent, and splitting the resulting mixture into two gas streams which are in parallel passed through a second and third reactor to effect reduction of sulfur dioxide to form hydrogen sulfide and sulfur. Periodically, the flow in the first and third reactors is reversed to thereby subject these reactors to periodically alternating heat absorbing and desorbing cycles while the flow in the second reactor is always maintained in the same direction. Inlet gas temperatures to the second and third reactors are maintained within desired ranges by by-passing a portion of the sulfur dioxide-containing gas stream and reducing agent around the first reactor.

16 Claims, 1 Drawing Figure

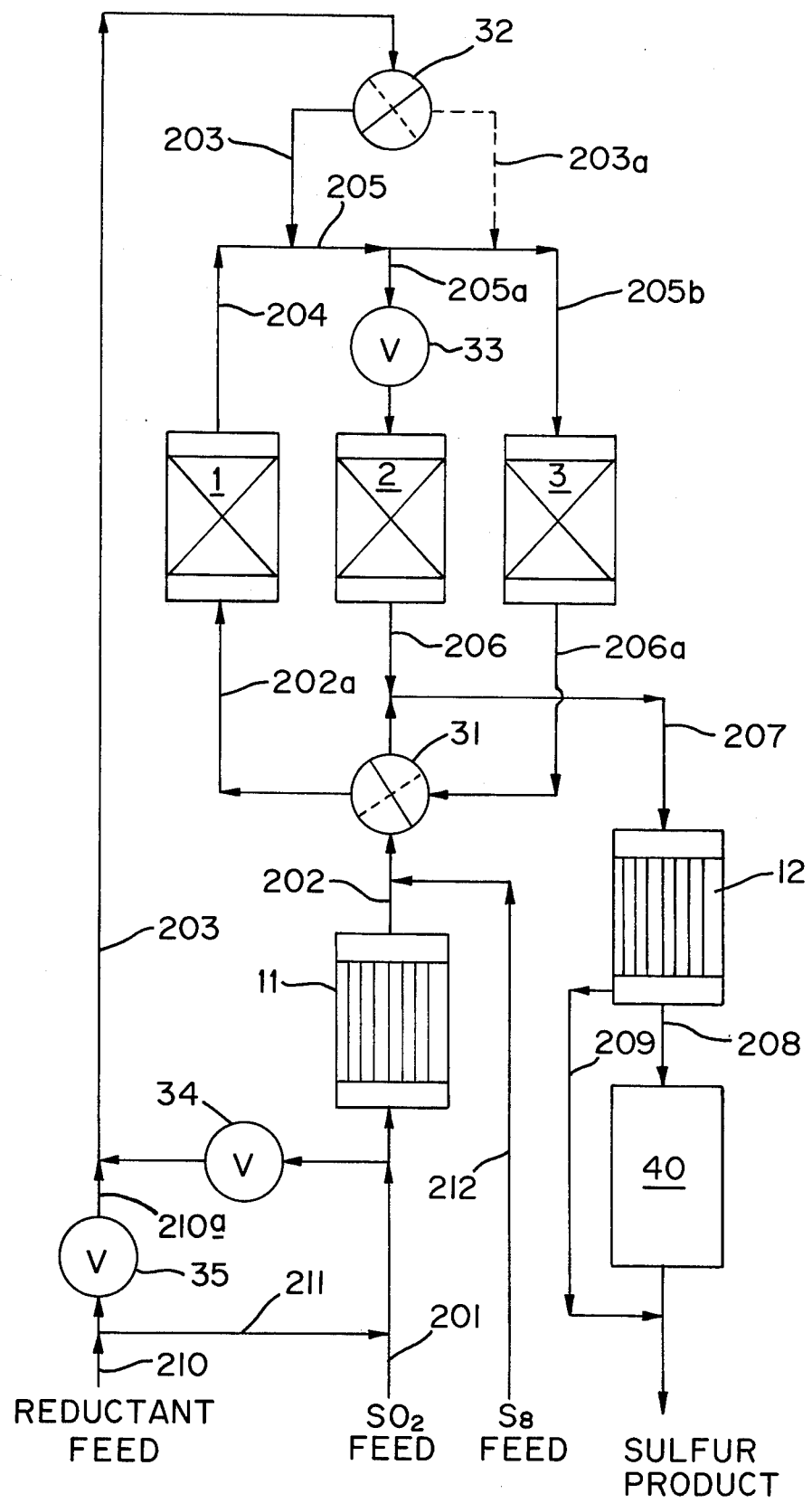

SULFUR DIOXIDE REDUCTION

BACKGROUND OF THE INVENTION

Appreciable amounts of sulfur dioxide are contained in many industrial gases vented into the atmosphere from plants involved in roasting, smelting and sintering sulfide ores such as chalcopyrite ($CuFeS_2$), iron pyrites ($FeS_2$), and pyrrhotite (FeS), in stack gases from power plants burning sulfur-bearing coal, or in exit gases from other industrial operations involving the combustion of sulfur bearing fuels, such as fuel oil. Air pollution as the result of sulfur dioxide emission in these gases presents not only a health hazard, but also results in loss of valuable sulfur values. Hence, sulfur dioxide is desirably recovered from such gases, desirably in the form of elemental sulfur.

The reduction of sulfur dioxide, including its reduction to elemental sulfur, has been investigated extensively, and there has been a myriad of references published on this subject. For instance, in U.S. Pat. Nos. 2,270,427; 2,388,259 and 2,431,236 the reduction of sulfur dioxide with natural gas, such as methane, is described wherein the sulphur values are recovered in an essentially three step reaction. In the first step the reduction of sulfur dioxide contained in the off gases from copper smelting operations is reacted with methane at temperatures of approximately 2280° to 2360° F. with a refractory material performing as a surface catalyst. The chief sulfur-containing by-products were carbonyl sulfide and hydrogen sulfide. The carbonyl sulfide is then reacted with additional sulfur dioxide at temperatures of about 800° to 840° F. over a bauxite catalyst to produce sulfur, and the hydrogen sulfide is reacted with still further amounts of sulfur dioxide at a temperature of about 410° to 450° F. in the presence of bauxite to produce sulfur by the well-known Claus reaction.

Similarly, in U.S. Pat. No. 3,199,955 to West et al. a process is disclosed employing three catalytic reduction steps to convert the sulfur dioxide to elemental sulfur, wherein the last step involves the well-known Claus reaction. In the first step, the reduction of sulfur dioxide with methane is achieved at temperatures of 1470° to 1830° F. in the presence of a catalyst including activated alumina, bauxite, calcium sulfide and quartz. With this process it is reported that between about 40 and 60% of the inlet sulfur dioxide appears in the production gases from the first step as elemental gaseous sulfur, the remainder is found as hydrogen sulfide, carbonyl sulfide, carbon disulfide and sulfur dioxide. The second and third steps of this process are essentially the same as those reported in the earlier patents. The carbonyl sulfide and carbon disulfide are reacted with sulfur dioxide to produce sulfur at a temperature of about 735° F. in the presence of a suitable catalyst, such as alumina; and in the final step (Claus reaction) the hydrogen sulfide is reacted with sulfur dioxide at a temperature of about 390° to 530° F. in the presence of a catalyst, such as activated alumina, to produce additional sulfur. While the process of that patent is said to be applicable to sulfur dioxide-containing gas streams of high concentrations, such as pure or concentrated sulfur dioxide, use of concentrated sulfur dioxide in the particular process configurations disclosed by West et al. will tend to pose difficult problems of temperature control within the reactors employed, as a result of which attainment and maintenance of stable operating conditions becomes difficult or impossible. This is so because gas streams containing relatively large proportions of sulfur dioxide on reduction thereof generate proportionately larger amounts of heat concentrated in relatively smaller volume, and the reduction reaction, once initiated, tends to proceed with considerable speed to the point of becoming uncontrollable.

Desirably, reduction of sulfur dioxide with a reducing agent should produce as few undesirable by-products as possible of those which may be formed, such as carbon monoxide, carbon disulfide, carbonyl sulfide and hydrogen, thereby achieving efficient utilization of the reducing agent. By-product formation depends upon a number of variables, including temperature, flow rate of reactants, ratio of reactants employed, and type of catalyst selected. Advantageously, equilibrium is sought because at equilibrium conditions the products formed in the reaction and their proportions are predictable, and under these circumstances conditions can predictably be chosen which favor reduction of sulfur dioxide to elemental sulfur, rather than to other reduction products. For instance, under specific equilibrium conditions at preferred operating temperatures, as hereinafter defined, employing methane as the reducing gas, the methane can be completely reacted with the sulfur dioxide so that the process can be expressed by the equations:

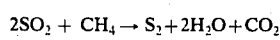

$$2SO_2 + CH_4 \rightarrow S_2 + 2H_2O + CO_2$$

$$6SO_2 + 4CH_4 \rightarrow 4CO_2 + 4H_2O + 4H_2S + S_2$$

Furthermore, essentially no detectable amounts of carbonyl sulfide and/or carbon disulfide are formed in the reduction of sulfur dioxide under equilibrium conditions at preferred operating temperatures and employment of reductant of essentially stoichiometric proportions. Accordingly, when chemical equilibrium is achieved under the above conditions there is no need to provide additional equipment to convert these by-products to additional sulfur and there is no loss of unreacted methane. Ideally, the reduction of sulfur dioxide with a reducing gas is conducted under conditions which favor equilibrium at lowest possible temperatures.

Yushkevich et al., Zh. Khim. Prom, No. 2, p. 33-37 (1934) reported on a study of reduction of sulfur dioxide with methane and disclosed that equilibrium of the reduction of sulfur dioxide with methane can be achieved under certain conditions within temperature range of from approximately 700° to 1000° C., and space velocities within the range of from 70 to 1000. Yushkevich et al. concluded from the results of their experiments that equilibrium is achieved in the reduction of $SO_2$ with methane at temperatures of 800° to 1000° C., by maintaining the space velocity of the gas reactants (sulfur dioxide and reducing agent) through the catalyst bed in the order of up to about 500. However, Yushkevich et al. found that at temperatures of 900° and 1000° C., respectively, and space velocities of 1000 (equivalent to a contact time of 0.8 second), the reaction product contained 2.1% and 0.7% methane, respectively. Yushkevich et al. report that at 800° C. and space velocities as low as 200 (equivalent to a contact time of about 4 seconds), substantial amounts of unreacted methane remain in the product gas mixture.

As can be appreciated, when the space velocity of the reactants which enter into the reaction is decreased (i.e, contact times increased) in order to achieve equilibrium, larger size process equipment would have to be employed for the same amount of gas treated thereby substantially increasing the capital cost of a commercial plant.

See, also, Averbukh et al., Khim. Prom., (3), 200 (1971), describing reduction of sulfur dioxide with methane or natural gas at temperatures of 750° to 900° C. in the presence of catalyst such as aluminum oxide, alumina, bauxite, alunite and dunite, employing sulfur dioxide-to-methane ratio of 1.54:1 at gas velocities chosen to obtain reaction times in the order of 0.07 to 0.48 seconds. Further, Averbukh and coworkers have investigated and reported on the kinetics of the thermal reduction of concentrated sulfur dioxide-containing gases by methane, employing gases containing 10, 20, 30, 40 and 100% $SO_2$ in their experiments (Averbukh et al., Khim. Prom., (44), 753 (1968).

Copending application of A. W. Michener et al., Ser. No. 238,644 filed March 27, 1972 discloses a process for reduction of sulfur dioxide wherein equilibrium may be achieved at temperatures from 1000° to 2400° F. employing extremely short contact times and very high velocities of the gases through the catalyst bed, under substantially complete consumption of the reducing agent.

U.S. Pat. No. 3,653,833 to Watson et al. describes a method for reducing sulfur dioxide to elemental sulfur and/or other gaseous sulfur compounds with a reducing gas in the presence of a catalyst at temperature within the range of from 1000° to 2400° F. by passing a gaseous reaction mixture of sulfur dioxide-containing gas with the reducing gas serially first through a regenerative heat exchanger to raise the temperature of the gas mixture to 1000° to 2400° F., then passing the heated gas mixture through a reaction chamber containing a catalyst to obtain a product gas stream comprising hydrogen sulfide, sulfur dioxide and sulfur, and finally passing the product gas stream through a second regenerative heat exchanger to absorb heat therefrom to reduce the temperature of that stream to about 700° to 800° F. In that process the regenerative heat exchangers are subjected to continuously alternating heat absorbing cycles while maintaining the passage of the gaseous reaction mixture through the reaction chamber in the same direction always. The exothermic heat of reaction is utilized in the regenerative heat exchanger system to preheat the feed gases, since the extremely corrosive nature of the gaseous product at high temperatures make use of conventional shell and tube exchangers difficult or impossible. The regenerative heat exchangers alternately preheat and cool the gases as the flow direction is periodically changed. The flow through the reactor is always in the same direction, and always in series with both regenerative heat exchangers.

While the process described by Watson et al. represents a significant advance in the art and is capable of handling sulfur dioxide-containing gas streams of widely varying sulfur dioxide content, utilization therein of gas streams containing high concentrations of sulfur dioxide tends to pose difficult problems of temperature control because of the relatively greater heat release during sulfur dioxide reduction in a relatively smaller volume of gas, leading to extremely high temperatures in the reaction zone and relatively short cycle durations in the regenerative heat exchangers, among others.

U.S. Pat. No. 3,928,547 to W. D. Daley et al. discloses a process for reduction of sulfur dioxide to elemental sulfur wherein a mixture of sulfur-dioxide-containing gas and a hydrocarbon reductant is reacted at elevated temperature in the presence of minor amounts of elemental sulfur, resulting in lowered initiation temperatures for the reduction reaction and in moderation of the progress of the reaction, thereby avoiding violent temperature rise.

More stringent pollution controls have in the recent past been imposed on coal-burning power plants with respect to both particulate as well as sulfur dioxide emissions. However, stack gases of coal-burning power plants generally contain less than about 1 percent, and more likely less than about ½ of 1 percent by volume of sulfur dioxide. Processing of the diluted sulfur dioxide contained in such stack gases to elemental sulfur is considered uneconomical unless the sulfur dioxide prior to reduction can be concentrated. There are available a number of sulfur dioxide recovery processes wherein sulfur dioxide is recovered from stack gases and obtained in more concentrated form as gas, generally containing more than about 8 percent by volume sulfur dioxide and ranging upwards in sulfur dioxide concentration up to 100 percent by volume, dry basis. Typical of these recovery processes are the so-called "regenerative alkaline" processes, wherein an alkaline agent such as sodium sulfite, ammonium sulfite, alkali or alkaline earth metal carbonate or magnesium oxide (MgO) strip the sulfur dioxide from the flue gas by combining chemically with the sulfur dioxide. In a separate regeneration step the agent is reconstituted and the sulfur dioxide gas is recovered. Other processes available include the so-called "regenerative solid adsorption" processes wherein a sulfur adsorber, such as activated char or activated carbon adsorbs the sulfur dioxide and then the sulfur dioxide is desorbed to produce a sulfur dioxide gas stream. Also, there are available the so-called "regenerative organic" processes which differ from the alkaline regenerative absorption processes in that an organic absorbing medium is employed. All of these regenerative processes, however, produce a sulfur dioxide-containing gas stream of high sulfur dioxide content of up to 100 percent sulfur dioxide by volume, dry basis.

It is an object of the present invention to provide an improved process for reducing sulfur dioxide in a sulfur dioxide-containing gas stream with a gaseous reducing agent in the presence of a catalyst, which is particularly suited to utilize a sulfur dioxide-containing gas stream of high sulfur dioxide concentration, such as may be obtained from a regenerative sulfur dioxide absorption process.

SUMMARY OF THE INVENTION

In accordance with the present invention there is provided a continuous process for the reduction of sulfur dioxide in a sulfur dioxide-containing gas stream with a gaseous reducing agent, which comprises the steps of:

a. admixing the sulfur dioxide-containing gas stream with a portion representing of from about 10 to about 95 percent of the total stream of gaseous reducing agent fed to the process and passing the resultant mixed gas stream through a first reaction chamber containing catalytic material, wherein the mixed gas stream is heated to a temperature of from about 850° to about 2400° F. and wherein a portion of the sulfur dioxide is reduced to form a gas stream comprising sulfur dioxide, hydrogen sulfide, and sulfur;

b. admixing the gas stream comprising sulfur dioxide, hydrogen sulfide, and sulfur obtained from the first reaction chamber with a stream of gaseous reducing agent representing the remaining portion of the total stream of gaseous reducing agent fed to the process, passing from about 10 to about 80 percent of the resultant mixed gas stream comprising reducing agent, sulfur dioxide, hydrogen sulfide, and sulfur through a second reaction chamber containing catalytic material, and passing the remaining portion of said mixed gas stream comprising reducing agent, sulfur dioxide, hydrogen sulfide, and sulfur through a third reaction chamber containing catalytic material in parallel with the gas stream being passed through the second reaction chamber, to produce in the second and third reaction chambers a product gas stream comprising hydrogen sulfide, sulfur dioxide, and sulfur, and wherein in the third reaction chamber heat is absorbed from the gas stream to reduce the temperature of the product gas stream from the third reaction chamber to from about 500° to about 1000° F.;

c. periodically reversing the flow in the first and third reaction chambers, thereby subjecting the first and third reaction chambers to periodically alternating heat absorbing and desorbing cycles while maintaining during the alternating cycles the gas flow through the catalyst bed in the second reaction chamber in the same direction; and d. maintaining the temperature of the gas stream entering the second and third reaction chambers within the range of from about 800° to about 1800° F. by by-passing of from about 0 to about 40 percent of the mixed gas stream obtained in step (a) above, around the first reaction chamber, and adjusting the proportion of the mixed gas stream so bypassed during the alternating heat absorbing cycles of the first and third chambers to maintain the gas inlet temperature of the second and third reaction chamber within the above-stated temperature range.

Desirably, a small amount of gaseous elemental sulfur is injected into the mixed gas stream obtained by admixing the sulfur dioxide-containing gas with a portion of the total stream of the gaseous reducing agent prior to passing it to the first reaction chamber containing catalytic material, to thereby lower the initiation temperature for the sulfur dioxide reduction reaction and to moderate that reaction. To that end, vaporous elemental sulfur in amount of about 0.05 to 3 mol percent, expressed as $S_8$, basis the total mols of reactants may be employed.

In the following description the first, second and third reaction chambers are sometimes referred to as upstream reactor, uni-directional flow reactor and downstream reactor, respectively, and the upstream and downstream reactors are sometimes collectively referred to as bi-directional flow reactors.

BRIEF DESCRIPTION OF THE DRAWING

The annexed drawing is a simplified flow diagram illustrating a preferred embodiment of the process of the present invention.

DETAILED DESCRIPTION OF THE INVENTION, OF THE PREFERRED EMBODIMENTS, AND OF THE BEST MODE PRESENTLY CONTEMPLATED FOR ITS PRACTICE

With reference to the drawing, equipment employed includes first, second, and third reactors, 1, 2 and 3, respectively, each of which contains a suitable catalytic material, preferably in the form of small balls, pellets or granules of approximately ⅛ to ¾ inch diameter. Any of the well-known catalysts previously recommended for the reduction of sulfur dioxide may be used, for example bauxite, alumina, silica, calcium sulfide, vanadium oxides and the like. Calcium aluminate is a preferred catalyst.

The sulfur dioxide which is reduced in the present process may be contained in a sulfur dioxide-containing gas stream which may be essentially pure sulfur dioxide, or it may be contained therein in diluted form as in an industrial waste gas wherein the sulfur dioxide content may vary of from about 1 percent up to 16 percent or more, the other components including such dilutents as oxygen, nitrogen, carbon dioxide and water vapor. Desirably, the sulfur dioxide-containing gas stream contains at least about 5 percent by volume of sulfur dioxide, preferably at least about 8 percent by volume of sulfur dioxide. The process of the present invention is particularly suited for reducing sulfur dioxide contained in gas streams relatively concentrated in sulfur dioxide, say containing more than about 20 percent by volume, especially containing more than about 30 percent and up to 100 percent by volume of sulfur dioxide, as may be obtained from regenerative sulfur dioxide recovery systems, as above discussed.

The gaseous reducing agent (hereinafter also referred to as "reductant") suitable for use in the process of the present invention includes carbon monoxide, hydrogen, or any of the gaseous hydrocarbons which heretofore have been employed for the reduction of sulfur dioxide. Preferred gaseous hydrocarbons include the normally gaseous hydrocarbons of 1 to 4 carbon atoms. A preferred gaseous reducing agent, for reason of availability, is natural gas which is a mixture comprising methane, ethane, propane, butanes, pentanes, nitrogen and carbon dioxide. However, methane, ethane, propane and butane may be employed individually or in a mixture with each other. The choice of the hydrocarbon reducing agent is based on cost rather than technical considerations. Carbon monoxide and hydrogen may be employed individually or combined as by-product gases of other chemical reactions, for example producer gas, water gas, Winkler gas and synthesis gas, which contain hydrogen and carbon monoxide in varying proportions.

The reduction of sulfur dioxide in the present process employing a hydrocarbon reducing agent, preferably natural gas or methane, is carried out to achieve maximum conversion using an amount of reducing agent sufficient to convert the sulfur dioxide to elemental sulfur and hydrogen sulfide, with only trace amounts of other sulfur-containing gases, and preferably a molar ratio of hydrogen sulfide to sulfur dioxide in the product gas stream of about 2:1. The molar ratio of reactants (sulfur dioxide to reducing agent) should be from about 1.33:1 and up to about 6.5:1, depending on the reducing agent employed. For example, if butane is used as reducing agent, a desirable ratio of sulfur dioxide to butane is from about 4.5:1 to about 6.5:1. If the reducing agent is methane, the ratio of sulfur dioxide to reducing agent should be from about 1.33:1 to about 2.0:1, with an especially preferred ratio of sulfur dioxide to reducing gas of from about 1.7:1 to 1.99:1. At ratios below about 1.33:1 and at ratios above about 2.0:1, the desired 2 to 1 molar ratio of $H_2S$ to $SO_2$ in the product gas is not achieved using methane as reducing agent. At ratios below about 1.33:1, the product gas may contain unreacted methane. If natural gas is used as reducing agent preferable molar ratios of the natural gas to sulfur dioxide will depend on its composition and can be experimentally determined. With desired sulfur dioxide to reducing gas ratios as above described maximum conversion is achieved, thereby providing maximum utilization of hydrocarbon reducing agent, and only small amounts of unreacted carbon monoxide and hydrogen appear in the product gas. Moreover, only trace amounts of carbonyl sulfide and carbon disulfide are detected in the product gas, so that after passage through a sulfur condenser to remove sulfur formed in the reduction reaction, it can be passed through a conventional Claus reactor wherein the hydrogen sulfide formed in the reduction reaction reacts with residual sulfur dioxide in the product gas stream to produce additional amounts of elemental sulfur.

In the process of the present invention the sulfur dioxide-containing gas stream is reacted with the gaseous reducing agent at elevated temperature from about 850° to about 2400° F., preferably of from about 950° to about 2000° F, if vaporized elemental sulfur is introduced into the reduction reaction, as is optional, in order to effect initiation of the reduction reaction at lower temperature and to moderate the reaction in the first reactor, as will be explained in further detail below. If initiation of the reaction in the first reactor is not effected in the presence of elemental sulfur, then reduction of the sulfur dioxide in the second and third reactor is still effected within the above-stated temperature limits, but reaction within the first reactor is conducted at temperature of from about 1000° to about 2400° F., preferably of from about 1500° to about 2000° F. In either event, contact times for the catalytic material within the reactor may range from about 0.25 to about 15 seconds, preferably of from about 0.5 to about 5 seconds, with superficial linear gas velocities being from between about ⅓ to about 30 feet per second. At contact times of less than about 0.1 second conversion tends to be imcomplete. To provide contact times of greater than about 15 seconds would require use of reactors having impracticably great bed depth and/or diameter. At superficial velocities of less than about ⅓ foot per second the required reactor diameter becomes too large to be practical, and with superficial gas velocities in excess of about 30 feet per second the sharp increase in pressure drop across a catalyst bed would lead to exorbitant power requirements.

Operation of the invention process is further illustrated with reference to the drawing. Sulfur dioxide feed gas obtained from a regenerative sulfur dioxide scrubbing system, which is essentially oxygen-free and contains about 90 percent sulfur dioxide, the balance being essentially water vapor, is introduced into the system through sulfur dioxide feed line 201. Natural gas is employed as reducing agent and is introduced into the system through reductant feed line 210 and a portion of it (as discussed in more detail below) is mixed with the sulfur dioxide feed gas. The resultant mixture is split into two streams. The first stream is passed through feed gas preheater 11, wherein it is preheated to temperature within the range of from about 500° to about 800° F., preferably from about 550° to about 650° F., then through hot gas feed lines 202 and 202a via first flow reversing valve 31, to be introduced into upstream reactor 1. The second stream is passed through cold gas by-pass control valve 34, through cold gas by-pass line 203 and second flow reversing valve 32 to be by-passed around the first reactor and to be introduced into uni-directional flow reactor 2 and downstream reactor 3, together with the exit gas from upstream reactor 1. The amount of sulfur dioxide feed gas which is by-passed around upstream reactor 1 is varied from about 0 to 40 percent of the total sulfur dioxide feed gas flow during the process cycle to effect inlet temperature control of uni-directional flow reactor 2 and downstream reactor 3, as will be explained further below.

About 10 to 95 percent of the natural gas which serves as reductant and which has been introduced into the system via reductant feed line 210 is routed via reductant feed split line 211 to be mixed with the sulfur dioxide feed gas stream. The amount of reductant to be passed through reductant feed split line 211 is controlled by reductant feed split control valve 35. A variable portion of the resultant mixed gas stream (from about 0 at the beginning of the cycle up to about 40 percent at the end of each cycle) is by-passed through cold gas by-pass line 203, as above described, to maintain a constant temperature within the range of from about 800° to about 1800° F., preferably from about 1200° to about 1400° F. at the inlet to uni-directional flow reactor 2 and downstream reactor 3. The remaining portion of the mixed gas stream is passed through feed gas pre-heater 11 wherein its temperature is raised, as above described. Before the gas stream so preheated is introduced into upstream reactor 1, vaporized sulfur is introduced into it through sulfur vapor feed line 212, as described in more detail below. The gas mixture is then passed through upstream reactor 1 wherein it absorbs heat previously stored in the catalyst mass. When sufficiently heated, the methane reacts with a part of the sulfur dioxide to produce hydrogen sulfide and elemental sulfur.

The hot gas mixture leaving upstream reactor 1 via upstream reactor exit line 204 is cooled by means of the gas mixture introduced through cold gas by-pass line 203, which enters through second flow reversing valve 32. The resultant gas mixture is then passed in parallel through uni-directional flow reactor 2 and reactor 3, where the remaining reductant is utilized for reduction of sulfur dioxide. In unidirectional flow reactor 2 the temperature profile across the catalyst bed remains essentially constant. In downstream reactor 3, on the other hand, heat of reaction is stored in the previously cooled catalyst bed and the reacted gases emerge from the bottom of the bed via downstream reactor exit line 206a cooler than the partially reacted gases which enter downstream reactor 3 via line 205b. The functions of upstream reactor 1 and downstream reactor 3 are periodically reversed by reversing the direction of flow through these vessels on cyclical basis by means of first and second flow reversing valves 31 and 32. These flow reversing valves are synchronized so that they move together. On reversing the flow, downstream reactor 3 takes over the function of upstream reactor 1, line 203a assumes the function of line 203; line 202a assumes the function of line 206a and vice versa; and line 204 assumes the function of line 205b and vice versa. Gas flow through uni-directional flow reactor 2, however, is always in the same direction. This cycle is reversed when the gas leaving upstream reactor 1 reaches the maximum desired temperature. The reacted gases leaving uni-directional flow reactor 2 and downstream reactor 3 respectively through lines 206 and 206a are combined in product gas line 207. Desirably, the gas temperature in line 207 is controlled at or near a predetermined temperature (say within about ± about 50° F. of that predetermined temperature) within the range of from about 800° to about 1800° F., by adjusting the relative flow through uni-directional flow reactor 2 and downstream reactor 3 by means of reactor feed split control valve 33. Adjustment of product gas temperature in line 207 provides means for thermally balancing the upstream and downstream reactors 1 and 3, so that upstream reactor 1 is depleted of heat at about the same time as downstream reactor 3 is fully heated, thus resulting in optimal cycling time, that is to say maximum cycle lengths. The reversal of cycles takes place about every 5 to about 60 minutes or more.

The combined product gas is introduced into sulfur condenser 12 via line 207, to be cooled to temperature sufficient to condense elemental sulfur, which is withdrawn via liquid sulfur line 209. The cooled gases are then reheated (reheater not shown) and introduced via feed line 208 into Claus unit 40, wherein the hydrogen sulfide formed in the reactors reacts with sulfur dioxide in the product gas stream to produce additional elemental sulfur.

The amount of sulfur which may be added to the hot sulfur dioxide feed gas prior to its introduction into upstream reactor 1, as above described, may range of from about 0.05 to about 3 mol percent, preferably about 0.1 to about 1.5 mol percent, expressed as $S_8$, of the feed gas. The sulfur is present in the form of elemental sulfur vapor, which may be produced by the process and is easily recycled. The sulfur vapor may be introduced at any point in the process upstream of upstream reactor 1 so long as the temperature of the gas is sufficiently high to prevent condensation of the sulfur. Sulfur addition, though optional, is preferred in order to reduce the initiation temperature for the reduction reaction in upstream reactor 1, and to moderate the reduction reaction so as to avoid relatively violent localized reaction and concomitant localized heat release.

As previously stated, upstream reactor 1 serves to partially perform the reduction reaction and to preheat sulfur dioxide-containing feed gas prior to introduction into unidirectional flow reactor 2 and downstream reactor 3. Preheating is effected by transferring heat stored in the catalyst on the downstream cycle into the gas stream as it is passed through the reactor on the upstream cycle. Conversely, the downstream reactor serves to store heat generated as the reduction reaction is completed on the downstream cycle. Table I below shows representative temperature profiles, for the gas in the bi-directional flow reactors (upstream reactor 1 and downstream reactor 3), for the upstream as well as for the downstream cycle, at the start, middle and end of such a cycle. The temperatures are determined at equally spaced points along the reactor in flow direction.

TABLE I

Bi-directional Flow Reactors
Temperature Profile During Cycle

| Point No. | | Upstream Cycle | | | Downstream Cycle | | |
|---|---|---|---|---|---|---|---|
| | | Start | Middle | End | Start | Middle | End |
| 1 | (inlet) | 600° F. | 600° F. | 600° F. | 1400° F. | 1400° F. | 1400° F. |
| 2 | | 745 | 625 | 600 | 1810 | 1920 | 1925 |
| 3 | | 820 | 680 | 625 | 1370 | 1730 | 1855 |
| 4 | | 870 | 735 | 660 | 1145 | 1430 | 1670 |
| 5 | | 910 | 785 | 710 | 1055 | 1200 | 1410 |
| 6 | | 950 | 830 | 750 | 1000 | 1100 | 1210 |
| 7 | | 980 | 870 | 795 | 960 | 1050 | 1115 |
| 8 | | 1010 | 900 | 830 | 920 | 1020 | 1065 |
| 9 | | 1040 | 940 | 860 | 875 | 980 | 1040 |
| 10 | | 1080 | 985 | 890 | 840 | 955 | 1010 |
| 11 | | 1170 | 1140 | 935 | 790 | 920 | 990 |
| 12 | | 1340 | 1120 | 990 | 745 | 870 | 960 |
| 13 | | 1630 | 1250 | 1090 | 690 | 810 | 925 |
| 14 | | 1850 | 1580 | 1250 | 650 | 750 | 875 |
| 15 | (outlet) | 1770 | 1870 | 1880 | 615 | 680 | 815 |

As the data in Table I show, the temperature of the gas near the inlet point in the upstream reactor on the upstream cycle gradually decreases as the cycle progresses. However, the temperature of the gas nearer the outlet increases as the cycle progresses. This is so because, as the cycle progresses, sensible heat stored in the catalyst mass is transferred into the relatively colder gas, thereby cooling the catalyst coming into contact with the relatively cooler gas. However, as the temperature of the gas increases, reduction of sulfur dioxide is initiated and progresses. Since this is an exothermic reaction, heat is generated toward the outlet end of the reactor, resulting in gradual shift of the zone of highest temperature of the catalyst mass toward the outlet end of the reactor. If the cycle were not reversed, the zone of highest temperature in the catalyst mass would eventually be "pushed out of the reactor", and the reduction reaction in the upstream reactor would eventually cease altogether. Before that happens, the cycle is reversed and the upstream reactor becomes the downstream reactor and, conversely, the downstream reactor the upstream reactor. As the gas flow is reversed, the former outlet of the upstream reactor now becomes the inlet of the downstream reactor and, as the data in Table I show, the zone of highest temperature, for both the gas as well as the catalyst gradually migrates, down into the catalyst mass. Heat generated by the reaction is being stored in the catalyst mass and distributed further down towards the outlet end (which will become the inlet end on the reverse cycle). From the above it can be seen that during the upstream cycle, heat previously stored in the upstream reactor is transferred into the gas, with resultant overall cooling of the catalyst mass within the upstream reactor. The temperature of the gas exiting the upstream reactor, however, increases as the cycle progresses. For that reason, the by-pass flow of cold gas mixture around upstream reactor 1 via line 203 must be increased as the cycle progresses. That by-pass flow may be as low as 0 percent at the beginning of the cycle and as high as 40 percent of the total sulfur dioxide and reductant at the end of the cycle.

The design of the equipment employed is within the skill of a competent worker conversant with the art, and is not part of the present invention.

The following Example further illustrates a preferred embodiment of the process of the present invention and sets forth the best mode presently contemplated for its practice.

EXAMPLE

Equipment employed is as illustrated in the drawing. Sulfur dioxide feed gas is essentially oxygen-free and contains about 96 percent by volume $SO_2$ and about 4 percent by volume water vapor. The reductant is natural gas. The catalyst employed is a mixture of calcium aluminate and alumina. The conditions in the upstream reactor, the uni-directional flow reactor and the downstream reactor include gas contact times in the order of 3.1, 3.0, and 3.8 seconds, respectively. Gas streams, temperatures and compositions are shown in Table II, below, with respect to points indicated by reference numerals in the attached drawing. Of the total reductant feed stream, about 60 percent is by-passed around upstream reactor 1 and is introduced into the gas stream entering uni-directional flow reactor 2 and downstream reactor 3. The amount of sulfur dioxide and reductant mixture by-passed around upstream reactor 1 varies from 0 percent at the beginning of the cycle to about 20 percent towards the end of the cycle. The length of the cycle is in the order of about 30 minutes. Temperatures, mass flow, and gas compositions for points indicated are summarized in Table II, below.

TABLE II

| | \multicolumn{10}{c}{Stream Number} | | | | | | | | | |
|---|---|---|---|---|---|---|---|---|---|---|
| | 201 | 202 | 204 | 205 | 206 | 206a | 207 | 211 | 212 | 210a |
| Lbs./hr. | 8,565 | 8,130 | 8,655 | 10,260 | 6,230 | 4,030 | 10,260 | 470 | 525 | 700* |
| Temp.-° F. | 250 | 590 | 1,850 | 1,400 | 1,780 | 700 | 1,130 | 200 | 870 | 200 |
| Volume % | | | | | | | | | | |
| $SO_2$ | 95.8 | 80.6 | 41.0 | 36.9 | 6.5 | 2.3 | 4.8 | | | |
| $H_2O$ | 4.2 | 3.5 | 25.9 | 20.0 | 36.8 | 52.3 | 40.6 | | | |
| COS | | | 0.1 | 0.1 | 0.4 | 0 | 0.2 | | | |
| CO | | | 0.4 | 0.3 | 1.4 | 0 | 0.8 | | | |
| $CS_2$ | | | 0 | 0 | 0 | 0 | 0 | | | |
| $H_2S$ | | | 2.8 | 2.2 | 11.7 | 6.7 | 9.5 | | | |
| $H_2$ | | | 0.5 | 0.3 | 1.4 | 0 | 0.9 | | | |
| $CO_2$ | | | 13.7 | 10.3 | 24.1 | 30.6 | 25.4 | | | |
| $CH_4$ | | 15.9 | 0 | 17.5 | 0 | 0 | 0 | 100 | | 100 |
| $S_2$ | | | 15.6 | 11.9 | 17.7 | 0.2 | 16.5 | | 4.6 | |
| $S_6$ | | | 0 | 0 | 0 | 4.4 | 1.2 | | 56.1 | |
| $S_8$ | | | 0 | 0 | 0 | 3.5 | 0.1 | | 39.3 | |

*60% by-pass

Since various changes or modifications may be made in the invention without departing from the spirit and essential characteristics thereof, it is intended that all matter contained in the above description shall be interpreted as illustrative only, the invention being limited only by the scope of the appended claims.

I claim:

1. A continuous process for the reduction of sulfur dioxide in a sulfur dioxide-containing gas stream with a gaseous reducing agent selected from the group consisting of carbon monoxide, hydrogen, normally gaseous hydrocarbons of 1 to 4 carbon atoms, and mixtures thereof, which comprises the steps of:
   a. admixing said sulfur dioxide-containing gas stream with a portion comprising of from about 10 to about 95 percent of the total stream of gaseous reducing agent fed to the process, and passing of from about 60 to 100 percent of the resultant mixed gas stream through a first reaction chamber containing catalytic material, wherein said mixed gas stream is heated to a temperature of from about 850° to about 2400° F. and wherein a portion of the sulfur dioxide is reduced to form a gas stream comprising sulfur dioxide, hydrogen sulfide, and sulfur, and by-passing the remaining portion of the resultant mixed gas stream around the first reaction chamber;
   b. admixing said gas stream comprising sulfur dioxide, hydrogen sulfide, and sulfur obtained from said first reaction chamber with (i) the remaining portion of the total stream of gaseous reducing agent fed to the process and, (ii) from 0 to about 40 percent of the mixed gas stream obtained in step (a), above, then passing from about 10 to about 80 percent of the resultant mixed gas stream comprising reducing agent, sulfur dioxide, hydrogen sulfide, and sulfur through a second reaction chamber containing catalytic material, and passing the remaining portion of said mixed gas stream comprising reducing agent, sulfur dioxide, hydrogen sulfide, and sulfur through a third reaction chamber containing catalytic material in parallel with the gas stream being passed through said second reaction chamber, to produce in said second and third reaction chambers a product gas stream comprising hydrogen sulfide, sulfur dioxide, and sulfur, wherein in said third reaction chamber heat is absorbed from the gas stream to reduce the temperature of the product gas stream from said third reaction chamber to from about 500° to about 1000° F.;
   c. periodically reversing the flow in said first and third reaction chambers, thereby subjecting said first and third reaction chambers to periodically alternating heat absorbing and desorbing cycles while maintaining during the alternating cycles the gas flow through the catalyst bed in said second reaction chamber in the same direction; and
   d. maintaining the temperature of the gas stream entering said second and third reaction chambers within the range of from about 800° to about 1800° F. by varying the proportion of said mixed gas stream obtained in step (a), above, which is by-passed around the first reaction chamber during the alternating heat absorbing cycles of the first and third chambers so as to maintain the gas inlet temperature of said second and third reaction chamber within the above-stated range.

2. The process of claim 1 with the additional step of introducing into that portion of the mixed gas stream obtained in step (a) which is introduced into the first reaction chamber vaporous elemental sulfur in amount of about 0.05 to 3 mol percent, expressed as $S_8$, basis the total mols of reactants in that portion of the mixed gas stream.

3. The process of claim 1 wherein the sulfur dioxide-containing gas stream contains more than about 30 percent by volume, dry basis, of sulfur dioxide.

4. The process of claim 1 wherein the gaseous reducing agent is natural gas.

5. The process of claim 1 wherein the gaseous reducing agent is methane.

6. The process of claim 1 wherein the gaseous reducing agent comprises hydrogen and carbon monoxide.

7. The process of claim 1 wherein the gaseous reducing agent is a hydrocarbon of 1 to 4 carbon atoms.

8. The process of claim 1 wherein the catalytic material is calcium aluminate.

9. The process of claim 1 wherein the catalytic material is bauxite.

10. The process of claim 1 wherein the catalytic material is alumina.

11. The process of claim 1 wherein the catalytic material is silica.

12. The process of claim 1 wherein the catalytic material is a vanadium oxide.

13. The process of claim 1 wherein the reducing agent is methane and the molar ratio of sulfur dioxide to reducing agent is from about 1.33:1 to about 2:1.

14. The process of claim 13 wherein the sulfur dioxide-containing gas stream contains more than about 30 percent by volume, dry basis, of sulfur dioxide.

15. The process of claim 14 wherein in step (a) the gas stream in the first reaction chamber is heated to temperatures of from about 1500° to about 2000° F., and wherein in step (d) the temperature of the gas stream entering the second third reaction chambers is maintained within the range of from about 1200° to about 1400° F.

16. The process of claim 15 with the additional step of introducing into that portion of the mixed gas stream obtained in step (a) which is introduced into the first reaction chamber vaporous elemental sulfur in amount of about 0.05 to 3 mol percent, expressed as $S_8$, basis the total mols of reactants in that portion of the mixed gas stream.

* * * * *